United States Patent
Gold

(10) Patent No.: US 8,850,885 B1
(45) Date of Patent: Oct. 7, 2014

(54) WATER AIR-BUBBLE FRAGMENT RECOVERY TEST APPARATUS

(71) Applicant: Vladimir M. Gold, Hillside, NJ (US)

(72) Inventor: Vladimir M. Gold, Hillside, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 111 days.

(21) Appl. No.: 13/714,852

(22) Filed: Dec. 14, 2012

(51) Int. Cl.
  *G01F 15/14* (2006.01)
  *G01M 99/00* (2011.01)
(52) U.S. Cl.
  CPC .................................... *G01M 99/00* (2013.01)
  USPC ....... 73/432.1; 73/35.14; 73/35.15; 73/35.16; 73/35.17; 73/865.6; 86/50; 102/293

(58) Field of Classification Search
  USPC ............ 73/35.14–35.17, 571, 865.6; 102/331
  See application file for complete search history.

(56) References Cited

U.S. PATENT DOCUMENTS 3,427,841 A * 2/1969 Neuhold et al. ................... 72/56
4,174,624 A * 11/1979 Shrum ............................... 72/56

* cited by examiner

*Primary Examiner* — Peter Macchiarolo
*Assistant Examiner* — Anthony W Megna Fuentes
(74) *Attorney, Agent, or Firm* — Michael C. Sachs

(57) ABSTRACT

A water air-bubble fragment recovery test apparatus that facilitates accurate assessment of fragmentation characteristics and lethality that are normally detonated in air. An airtight, waterproof plastic container encloses a test warhead; the plastic container may then also be filled with a gas or just with air. The container is then embedded in a water-gas-bubble mixture found in a water tank, for the warhead to be detonated therein, and the fragments to then be later recovered.

10 Claims, 2 Drawing Sheets

WATER AIR-BUBBLE FRAGMENT RECOVERY TEST APPARATUS

U.S. GOVERNMENT INTEREST

The inventions described herein may be made, used, or licensed by or for the U.S. Government for U.S. Government purposes.

BACKGROUND OF INVENTION

It is necessary to find an improved test apparatus that allows soft recovery of high velocity projectiles with minimum breakage or fractures, and, in particular, an apparatus that facilitates accurate and inexpensive assessment of fragmentation characteristics and lethality of explosive fragmentation munitions upon detonation. Conventional techniques for recovery of high velocity Explosively Formed Fragments generated by Shaped Charge Jets, Explosively Formed Penetrator Warheads, and Explosive Fragmentation Munitions had been traditionally relying on low density fragment capture media such as packs of fiberboard (Celotex™) panels, ballistic gelatin, styrofoam, etc. In particular, in the case of Explosive Fragmentation Munitions, conventional recovery methods include firing munitions into an open-air arena fragmentation test structure (cylindrical structure enclosing the test warhead with a series of side-by-side packs of fiberboard panels) capturing only a small portion of the fragments, typically, bellow 6% of the total, or into completely enclosed rectangular or cylindrical plastic or steel structures filled with the fragment capture media, usually loose sawdust or water.

In a typical fragmentation arena test setup, tested munitions are positioned at the origin of the reference polar coordinate system and surrounded with series of velocity measuring screens and fragment-catching witness panels, all at significant distances from the warhead. The distance between the warhead and the fragment capture panels is determined by the weight of the explosive contained in the warhead, the type of the explosive, and the resilience of the panel structure to survive blast and fragment impact loads. For example, for an approximately 13 lb TNT-filled warhead, the standoff distances are in the order of approximately 6 meters, and by the time fragments reach the capture packs the average fragment velocities drop by approximately 20% to 30% compared to that at the burst. Defining the longitudinal axis of the munition as the polar axis z, the polar altitudinal angles $\Theta$ are measured from the munition's nose ($\Theta=0°$) to the tail ($\Theta=180°$), and the azimuthal angles $\phi$ are measured from an arbitrary projectile's feature ($\phi=0°$) in a counterclockwise direction. In conventional fragmentation arena test procedures fragment sampling and fragment velocity measuring is usually limited to relatively small azimuthal sections, mainly because of enormous construction and data assessment costs associated with recovering fragments from the entire fragmenting shell. This sampling technique requires the assumption of isotropic fragmentation properties for all azimuthal angles $\phi$ throughout the entire $\Theta$-angle zone (i.e., a complete altitudinal region bounded by two polar angles). By sampling small azimuthal angles across all polar zones from the munition nose to tail and adjusting this sample data mathematically, a prediction for entire munition fragment characterization is obtained. Since only a small azimuthal section of the region is sampled and scaled up, even relatively small munition positioning errors may result in large deviations of the fragmentation data, routinely requiring repeated testing for statistical data stability. For example, with only 6% of all the fragments recovered in the arena test structure, the discrepancy between numbers of fragments recovered from repeated fragmentation arena tests and that from a completely enclosed rectangular sawdust or water recovery structure is typically 25% to 30%.

In the second type of the fragmentation characterization test setup, commonly known as a "100%" fragment capture test, the tested munition is completely enclosed by the test structure filled with low density fragment capture media, usually sawdust or water, or with a combination thereof. Because the test structure can be re-used, and the fragment recovery and counting can be easily automated, the 100% fragment capture test costs are substantially lower than that of the fragmentation arena tests, making it extremely useful in the initial munition development phases.

In the "100%" fragment capture test, the fragment recovery rate is usually approximately 96% to 99.5% of the initial fragmentation case mass, depending on the test setup, the capture medium employed, and the mechanical properties of the fragmentation case material. Given the maximum 99.5% fragment recovery rate and typical fragmentation case materials, approximately 2% to 4% of the case mass usually ends up in a multitude of fragments with weights below 0.2-grains, partially because of the "natural" fragment formation process, partially because of the secondary fragment breakup caused by the capture medium. Since contribution to the lethality of small fragments with weight below 0.2-grains is minimal, these fragments are usually neglected in the fragmentation warhead characterization and commonly referred to as fragment "dust".

In the case of the fragmentation arena test setup, because the fragments are first "gently" decelerated by the air drag and then captured by fiberboard or other types of capture panels, the secondary fragment breakage is usually significantly less than that in the 100% fragment recovery tests, either in the sawdust, or in the water. For example, X-ray flash-radiography of fragmentation munitions detonated in free air reveals presence of large numbers of long "spaghetti-like" fragments, never captured if the same warheads had been tested either in the water, or in the sawdust. It should be noted, that, although the "100%" fragment capture test data is a strong function of the fragment capture medium employed, the resulting data are usually statistically stable, with the average deviations in the order of 3% to 5%, at the maximum. Accordingly, the solution for improving the accuracy of the 100% fragment capture test can be found by optimizing properties of the fragment capture medium.

This invention relates to an improved fragment recovery test apparatus and, more particularly, to a test apparatus for "100%" recovery of fragments resulting from detonation of explosive fragmentation munitions. According to such means, a low density water-gas-bubble suspension medium is provided which enables optimal deceleration of high velocity fragments and minimization of fragment damage otherwise ordinarily exerted by the fragment capture medium drag forces. According to an embodiment of the invention, the munition is exploded into a water-gas-bubble mixture which is generated by pumping pressurized air through an air bubble dispenser immersed in a water tank; a test warhead is then loaded into a hollow openable plastic container supported within the water tank, and can then be detonated in such mixed water-gas-bubble suspension medium.

BRIEF SUMMARY OF INVENTION

Shown here is a water air-bubble fragment recovery test apparatus that facilitates accurate assessment of fragmentation characteristics and lethality of explosive fragmentation munitions that are normally detonated in air. The low density water-gas-bubble suspension media enables optimal deceleration of high velocity fragments and minimizes fragment damage normally exerted by drag forces. As described in this invention, this water-gas-bubble mixture is generated by pumping pressurized air through an air bubble dispenser immersed in a water tank. An airtight, waterproof plastic container encloses a test warhead; the plastic container may then also be filled with a gas or just with air, which gas or air might also be loaded at a pressure above standard if so desired. The container is then embedded in the water-gas-bubble mixture found in the tank, for the warhead to be detonated therein.

OBJECTS OF THE INVENTION

Accordingly, it is an object of the present invention to provide an improved fragment recovery system for explosive fragmentation munitions that heretofore have been detonated in air.

Another object of the present invention is to provide a water air-bubble fragment recovery test apparatus that facilitates accurate assessment of fragmentation characteristics and lethality of explosive fragmentation munitions.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

DETAILED DESCRIPTION

Figure 1:
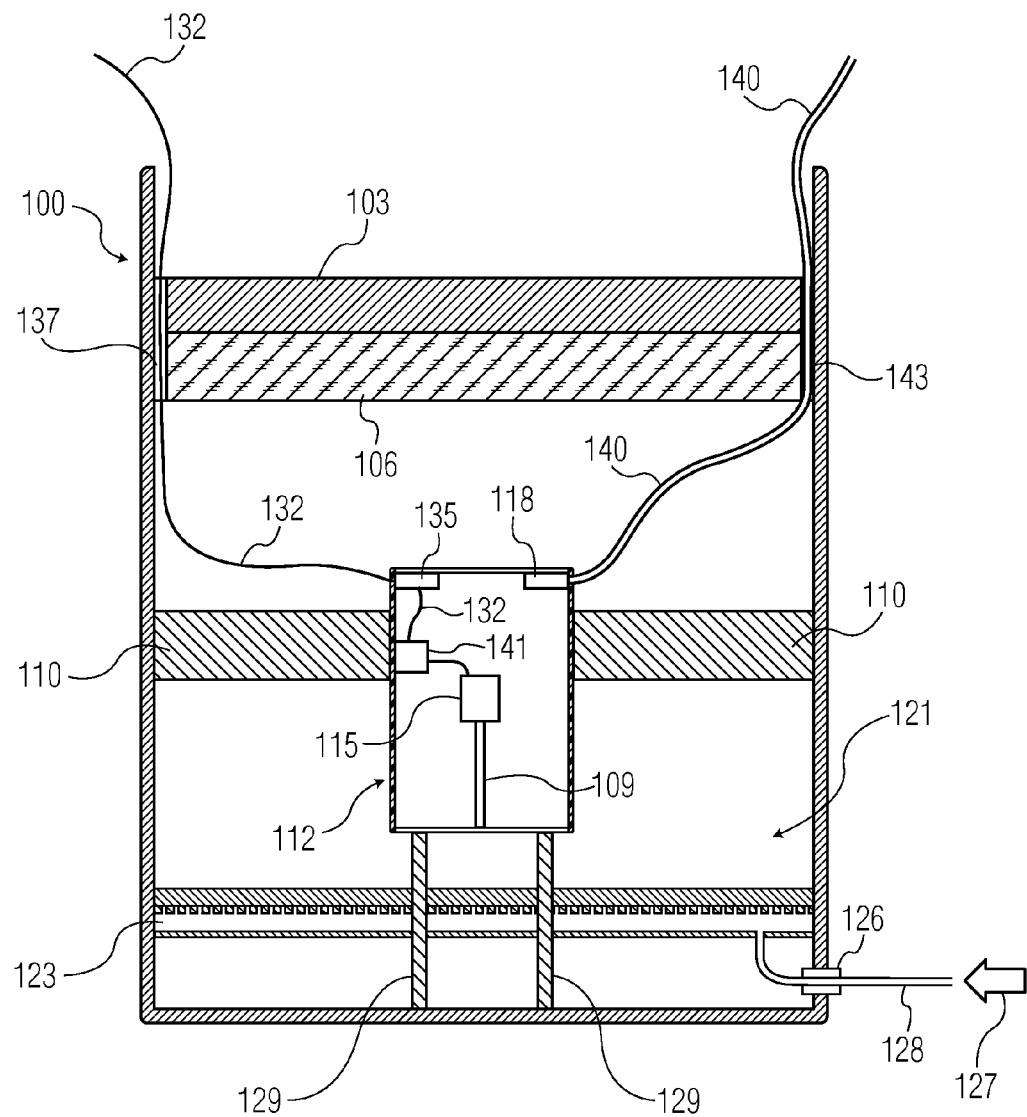
FIG. 1 shows a cross section view of a water air-bubble fragment recovery system according to this invention.
Figure 2:
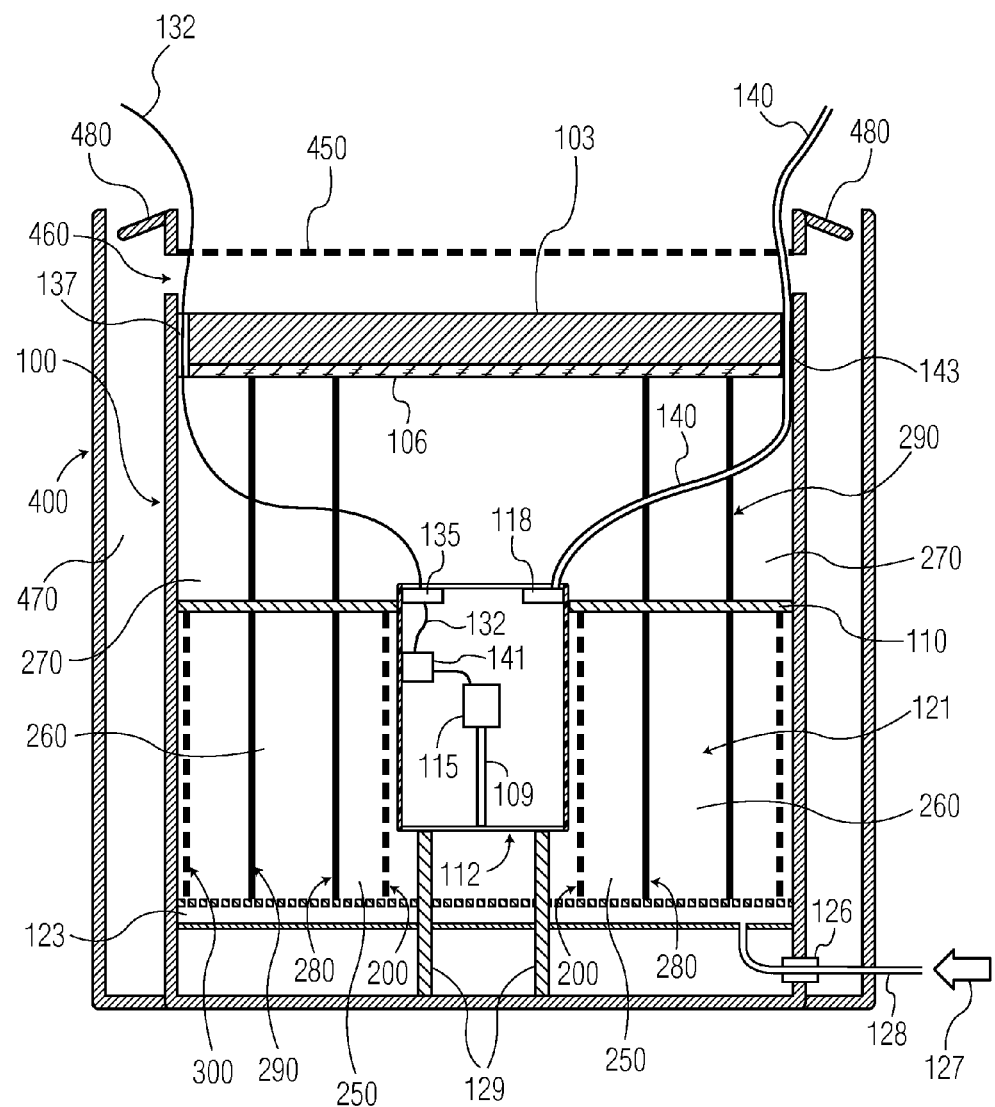
FIG. 2 shows a cross section view of a water air-bubble fragment recovery system in an added overflow tank, and having zones 250, 260, 270 of varying bubble density, according to this invention.

FIGS. 1 and 2 show a steel (or other suitable material) cylindrical shaped tank 100. Within the tank, an airtight, waterproof, hollow openable plastic container 112 is supported vertically above the bottom of the tank by at least two support pillars 129, and is also supported horizontally by a horizontal support means 110. The tank 100 is intended to contain a liquid such as water, e.g., and has a floating cover 106 at liquid level vertically higher above that of the top of said plastic container, and said floating cover is then also held down by a ballast means 103. Within the low density plastic container 112 may be placed a test warhead 115 which has a detonation means 141, and which is supported by warhead support means 109. There may be interface means 135 on said container and a first indented area 137 in the edge of said tank cover and ballast means to allow electrical wiring 132 to be fed through into said container, and then to the detonation means, even though the container is airtight and waterproof sealed, and said tank has ballast and cover firmly installed, so as to be able to electrically detonate said test warhead if desired in that manner from outside the container (and from outside said steel tank). Alternatively, the detonation means 141 may be wirelessly detonated by remote control radio signals, eliminating the wiring instead. In operation, ideally the sealed plastic container, already loaded with a test warhead, is then ideally just left filled with standard pressure air, or if desired then finally pre-filled with a different gas, or the gas or air may be pre-filled at a pressure above standard through a first one way valve means 118 on the plastic container, through piping means 140. Piping means 140 may then be disconnected before testing and the closing of the tank. Alternatively, using a second indent passage 143 in the edge of the floating cover and ballast means, line 140 may be led in and a gas can be pumped in from outside the tank as may be desired. At the base area of the tank is found an air bubble dispensing device 123 which is operated by pressurized air 127 fed on tube 128 through an interface second one way valve means 126 on the tank. The air bubble dispensing device 123 is circularly shaped (from a top view—not shown), and is covered by a circular part (not shown) which has various adjustable nozzles which can direct bubbled air in various zones 250, 260, and 270 and can be adjusted in stages between full force intensity of release of bubbled air to none at all, as may be desired by the operator. The invention thus sets forth a water air-bubble fragment recovery test apparatus and, more particularly a test apparatus for recovery of fragments resulting from detonation of a test warhead which is intended to comprise an explosive fragmentation munition. According to an embodiment of the invention, such water air-bubble fragment recovery test apparatus facilitates accurate assessment of fragmentation characteristics and lethality of explosive fragmentation munitions that are normally detonated in air. Thus, the low density water-gas-bubble suspension media enables optimal deceleration of high velocity fragments and minimizes fragment damage exerted by drag forces. As further described herein, such water-gas-bubble mixture was generated by pumping pressurized air through the air bubble dispenser 123 immersed in said water tank 100. In order to minimize the "drag" or water penetration resistance forces exerted on fragments, a gradual increase of water density from area 200 at the proximity to plastic container 112 to area 300 near the wall of the steel container 100 is desirable. Such varied bubble to water density gradient(s) can be provided by gradual decrease in the rate at which the air is dispensed from the air bubble dispenser 123. To sustain required water density in partitioned zones 250, 260, 270, a series of vertical cylindrical thin (approximately 10 mils thick) plastic films 280 and 290 (top view not shown) are deposited within tank 100. The number and radial size of the zone 250, 260, 270 (selected by the operator) are determined by the optimum gradient of the water density desirable. Further include in the invention, steel tank 100 may be deposited in an overflow tank 400, creating an overflow space 470. Upon detonating the test warhead, under the action of the blast load, water-bubble suspension 121 including floating cover 106 and ballast 103 are displaced vertically reaching a predetermined overflow limit level 450. Once the displaced liquid reaches the overflow limit, a part of the liquid is released through a series of orifices 460 into overflow space 470, which may be directed by flow deflectors 480.

While the invention may have been described with reference to certain embodiments, numerous changes, alterations and modifications to the described embodiments are possible without departing from the spirit and scope of the invention as defined in the appended claims, and equivalents thereof.

What is claimed is:

1. An apparatus for recovering fragments of an exploded fragmentation munition of a test warhead, the apparatus comprising:
a tank partially filled with water; an air bubble dispenser immersed in said tank; an external pump for pumping pressurized air through the air bubble dispenser to generate a water-gas-bubble mixture medium; an airtight, waterproof, hollow openable plastic container in said tank supported vertically above the bottom of the tank by at least two support pillars, and also supported horizontally by a horizontal support means; a floating cover liquid level vertically higher above that of the top of said plastic container, and said floating cover then in turn also held down by a ballast means; and said test warhead mounted within the plastic container and may be detonated for a test.

2. The apparatus of claim 1 wherein the pressurized air is fed through an interface one way valve means on the tank.

3. The apparatus of claim 1 wherein the tank is made from steel.

4. The apparatus of claim 1 wherein said test warhead is supported by a warhead support means.

5. The apparatus of claim 1 wherein said hollow openable plastic container contains a detonation means.

6. The apparatus of claim 1 further including an air tight waterproof interface means which allows an electrical wire means to be fed into said plastic container.

7. The apparatus of claim 1 further including an air tight waterproof interface means which allows a tube means to be fed into said plastic container.

8. The apparatus of claim 1 further including a first indent means in said floating cover and ballast means to allow electrical wire means to be fed there through.

9. The apparatus of claim 1 further including a second indent means in said floating cover and said ballast means to allow a tube means to be fed there through.

10. The apparatus of claim 1 said test warhead is detonated by a detonator means.

* * * * *